United States Patent
Petrescu et al.

(10) Patent No.: US 9,307,391 B2
(45) Date of Patent: Apr. 5, 2016

(54) METHOD AND SYSTEM FOR MANAGEMENT OF THE MOBILITY OF A MOBILE NETWORK

(71) Applicant: COMMISSARIAT A L'ENERGIE ATOMIQUE ET AUX ENERGIES ALTERNATIVES, Paris (FR)

(72) Inventors: Alexandre Petrescu, Nozay (FR); Michael Mathias Boc, Clamart (FR); Christophe Janneteau, Chaudon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 69 days.

(21) Appl. No.: 14/377,476

(22) PCT Filed: Feb. 27, 2013

(86) PCT No.: PCT/EP2013/053968
§ 371 (c)(1),
(2) Date: Aug. 7, 2014

(87) PCT Pub. No.: WO2013/127881
PCT Pub. Date: Sep. 6, 2013

(65) Prior Publication Data
US 2015/0049669 A1 Feb. 19, 2015

(30) Foreign Application Priority Data
Feb. 28, 2012 (FR) ...................................... 12 51780

(51) Int. Cl.
*H04W 8/08* (2009.01)
*H04L 29/12* (2006.01)

(52) U.S. Cl.
CPC ........... *H04W 8/085* (2013.01); *H04L 61/2015* (2013.01); *H04L 61/6068* (2013.01)

(58) Field of Classification Search
None
See application file for complete search history.

(56) References Cited

U.S. PATENT DOCUMENTS

| 8,788,826 | B1 * | 7/2014 | Zhao | H04L 29/12283 713/162 |
|---|---|---|---|---|
| 2009/0031130 | A1 * | 1/2009 | Hirano | H04L 29/12009 713/170 |
| 2009/0040964 | A1 * | 2/2009 | Zhao | H04L 29/12311 370/328 |
| 2009/0225761 | A1 | 9/2009 | Sarikaya et al. | |
| 2010/0040021 | A1 * | 2/2010 | Aso | H04W 8/06 370/331 |

FOREIGN PATENT DOCUMENTS

WO 2009014318 A1 1/2009

OTHER PUBLICATIONS

S. Gundavelli, et al., "Stardards Track—Proxy Mobile IPv6", Network Working Group, RFC 5213, Aug. 2880, pp. 1-86, http://www.rfc-editor.org/rfc/rfc5213.bd.

(Continued)

*Primary Examiner* — Hicham Foud
(74) *Attorney, Agent, or Firm* — Baker & Hostetler LLP

(57) ABSTRACT

A system and a method is provided for managing the mobility of a mobile network in a Proxy Mobile Internet Protocol (PMIP) environment operating under the Dynamic Host Configuration Protocol (DHCP) protocol. The method is based on prefix allotment between a server DHCPv6 and a mobile router via an access gateway (MAG) and the exchanging of messages between the server and a point of attachment (LMA).

13 Claims, 5 Drawing Sheets

(56) References Cited

OTHER PUBLICATIONS

O. Troan, et al., "Standards Track—IPv6 Prefix Options for Dynamic Host Configuration Protocol (DHCP version 6", Network Working Group, RFC 3633, Dec. 2003, pp. 1-18, http://www.rfc-editor.org/rfc/rfc3633.txt.

Kang-Won Lee, et al., "Global Mobility Management Scheme with Interworking between PMIPv6 and MIPv6", IEEE International Conference on Wireless & Mobile Computing, Networking & Communication, Oct. 12, 2008, pp. 153-158, IEEE, Piscataway, NJ, USA, XP031350708.

* cited by examiner

METHOD AND SYSTEM FOR MANAGEMENT OF THE MOBILITY OF A MOBILE NETWORK

CROSS-REFERENCE TO RELATED APPLICATIONS

This application is a National Stage of International patent application PCT/EP2013/053968, filed on Feb. 27, 2013, which claims priority to foreign French patent application No. FR 1251780, filed on Feb. 28, 2012, the disclosures of which are incorporated by reference in their entirety.

FIELD OF THE INVENTION

The invention relates to mobile networks and more particularly to the mobility of such mobile networks in a Proxy Mobile Internet Protocol environment operating under the Dynamic Host Configuration Protocol protocol.

PRIOR ART

The Mobile Internet Protocol (MIP) is a communication protocol which allows a user of an independent terminal or of a user device (respectively Mobile Host MH or User Equipment UE) to move with the same IP address from an origin IP network (mother network or Home Network HN) to another IP network (visited network or Foreign Network) while keeping his connections active.

An IP network within which the mobility of the devices is managed by the Proxy Mobile IP protocol is called a proxy mobility domain ("Proxy Mobile IP (PMIP)"). Proxy mobility is specified by the Internet Engineering Task Force (IETF) in various 'Request For Comments' (RFC) documents. In particular, [RFC5213] defines the Proxy Mobile IP protocol Version 6 (PMIPv6) to which reference may be made as current state of the art of Proxy mobility.

The "Dynamic Host Configuration Protocol or DHCP" protocol is widely used in networks to manage assignments of IP addresses. It makes it possible to use DHCP servers to make dynamic assignments of IP addresses and other corresponding aspects of configuration for DHCP clients of a network. In a PMIPv6 network, the DHCP protocol makes it possible to assign IP addresses to independent mobile devices or to mobile routers "MRs".

An IPv6 address is 128 bits long, its common representation being in the following example:
  2001:0db8:0000:85a3:0000:0000:ac1f:8001 where 8 groups of 2 bytes are separated by a colon sign. It is possible to encounter truncated representations and to omit from 1 to 3 non-significant zeros in each group of 4 hexadecimal digits. Thus, the above IPv6 address is equivalent to:
  2001:db8:0:85a3:0:0:ac1f:8001

Networks are labeled using a notation where the first address of the network is followed by an oblique slash and a number which indicates the size in bits of the network. The common part of the addresses is called a prefix. For example, the prefix 2001:db8:1f89::/48 represents the set of addresses which begins at 2001:db8:1f89:0:0:0:0:0 and finishes at 2001:db8:1f89:ffff:ffff:ffff:ffff:ffff.

Although the Proxy Mobile IPv6 protocol manages prefix allotment to form IPv6 addresses for independent devices, it does not manage such allotment for groups of devices in communication with a mobile router "MR". Such devices are generally designated as "Local Fixed Nodes or LFNs" and define a mobile platform or mobile network. The LFNs of one and the same network move together, in a homogeneous manner. Mobile networks such as these consist for example of a plurality of LFN terminals such as Smartphones, laptop computer, or tablet PC for the passengers of a boat, of an airplane, or of a car.

Thus for these mobile networks, it is necessary to maintain the connections active for each device when the mobile network moves.

A certain number of solutions exist making it possible either to allot one or more mobile network prefixes "MNPs" to a mobile router, or to improve the support of the DHCPv6 protocol in PMIPv6. Indeed, the DHCPv6 protocol possesses a "DHCPv6-PD" Prefix Delegation procedure defined in [RFC3633] which is a protocol for allocating IPv6 prefixes to IPv6 routers.

Particularly, as is described in the document by X. Zhou et al., "Prefix Delegation for Proxy Mobile IPv6", Internet Draft, draft-ietf-netext-pd-pmip-01.txt, Work in Progress, NETEXT Working Group, Working Group item, 31 Oct. 2011, this procedure consists in asking the DHCP server for a set of addresses or "prefix" which will thereafter be announced in PMIP mode by the mobile router in its mobile network. Prefix allocation with a DHCP server involves not only management of a set of addresses but also additional management of routing tables at the level of the DHCP server and DHCP relays. Moreover, it is difficult to ensure consistency of the prefix allocated simultaneously by two different protocols (PMIPv6 and DHCPv6-PD). The document cited does not specify any mechanism for this synchronization between DHCP and PMIP.

The need thus exists for a Proxy Mobile IPv6 infrastructure which supports the mobility of mobile networks operating under the DHCP protocol.

The present invention responds to this need.

SUMMARY OF THE INVENTION

An object of the present invention is to provide a method for managing the mobility of mobile networks operating under the DHCP protocol inside PMIP domains.

Another object of the present invention is to provide a method which offers the support of the DHCPv6-PD prefix delegation function in a PMIPv6 domain.

A more specific object of the present invention is to allow dynamic configuration of the addresses of mobile terminals belonging to a mobile network.

Another object of the present invention is to allow a mobile terminal inside a mobile network to obtain a global IP address and thus to communicate with a corresponding node situated at an arbitrary position in the Internet network.

Another object of the present invention is to offer stable communication when a mobile router toggles between two network access gateways "Mobile Access Gateway or MAG".

Advantageously but without limitation, the invention will find applications in systems for transport (public or private), security and defense, or telecommunications.

To obtain the results sought, a method and a system are proposed.

In particular, a method for managing the mobility of a mobile network in a Proxy Mobile Internet Protocol (PMIP) environment operating under the Dynamic Host Configuration Protocol (DHCP) protocol is presented. The mobile network comprises a mobile router in communication with at least one user device and the method comprising the steps of:
  receiving a message (DHCP Request) requesting a mobile network prefix (MNP/X), the message containing a unique DHCP identifier to identify the requesting mobile router (DUID);

allotting a mobile identifier value (MNID) to the unique DHCP identifier;

generating a message (DHCP Relay-Forward) requesting a mobile network prefix (MNP/X), the message containing the allotted value of the mobile identifier (MNID);

receiving a response message (DHCP Relay-Reply) containing an allocated mobile network prefix (MNP/Y) and the value of the mobile identifier (MNID);

restoring the value of the unique DHCP identifier; and transmitting a response message (DHCP Reply), the message containing the unique DHCP identifier of the requesting mobile router (DUID) and the allocated mobile network prefix (MNP/Y).

Various alternative implementations are described.

DESCRIPTION OF THE FIGURES

Various aspects and advantages of the invention will be apparent in support of the description of a preferred but non-limiting mode of implementation of the invention, with reference to the figures hereinbelow.

DETAILED DESCRIPTION OF THE INVENTION

Figure 1:
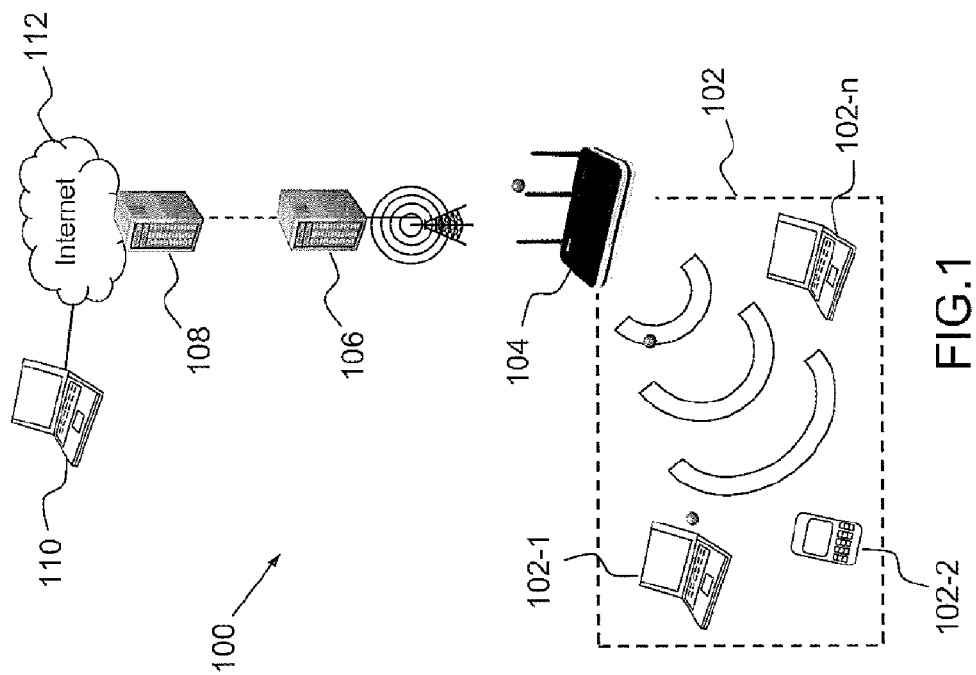
FIG. 1 is a topological representation of a mobile network architecture in which to preferably implement the invention.

FIG. 1 illustrates a general architecture 100 of mobile network operating under the DCHP protocol to implement the present invention. A mobile network (102) comprises a mobile router (104) and a plurality of individual LFN devices (102-1, 102-2, 102-n). The LFN terminals are in communication with the mobile router (104), preferably according to a wireless connection mode. The terminals can be any portable device such as laptop computers, notebooks, smartphones or Personal Digital Assistant (PDA).

The mobile router (104) is also a requesting router "RR" which dispatches IP address solicitation requests to a DCHP server "DSe" (108). The requests are conveyed through a DHCP relay (106) "DRe".

In an IPv6 environment, the mobile router (104) requests from the DHCP Server (108) via the DHCP relay (106) a set of IPv6 addresses or prefix according to the prefix delegation extension of the DHCPv6-PD protocol. This prefix is used by the LFNs of the mobile network (102) to communicate with remote computers or Corresponding Nodes "CNs" (110). A corresponding node can be an applications server, such as a Web server situated at an arbitrary location on Internet (112).

Figure 2:
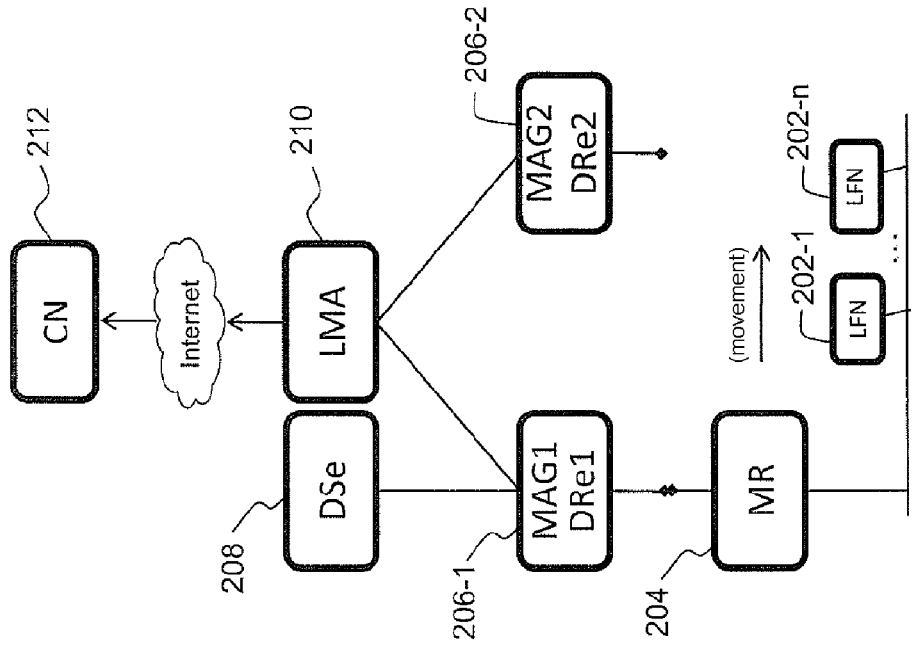
FIG. 2 is a topological representation of the PMIP and DHCP entities intervening in the method of the present invention.

FIG. 2 shows a topological representation of the entities intervening in the implementation of the present invention in the PMIPv6 environment according to the DHCP protocol.

The PMIPv6 specification defines the use of two types of entities located in the network for mobility management: the point of attachment "Local Mobility Anchor or LMA" (210) and the mobile router gateway "Mobile Access Gateway or MAG" (206-1, 206-2).

The LMA (210) can be located on a central server which makes it possible to access for example an Internet network. The central server can be a DSe server "DHCP Server" (208) operating under the DHCP protocol.

The MAG (206-1, 206-2) is located on an access IP router of the PMIP network which can be a DHCP relay (DRe1, DRe2).

The MAG (206-1) and the LMA (210) establish tunnels for bidirectional IP inter-communication so as to convey the communications of the nodes.

Figure 3:
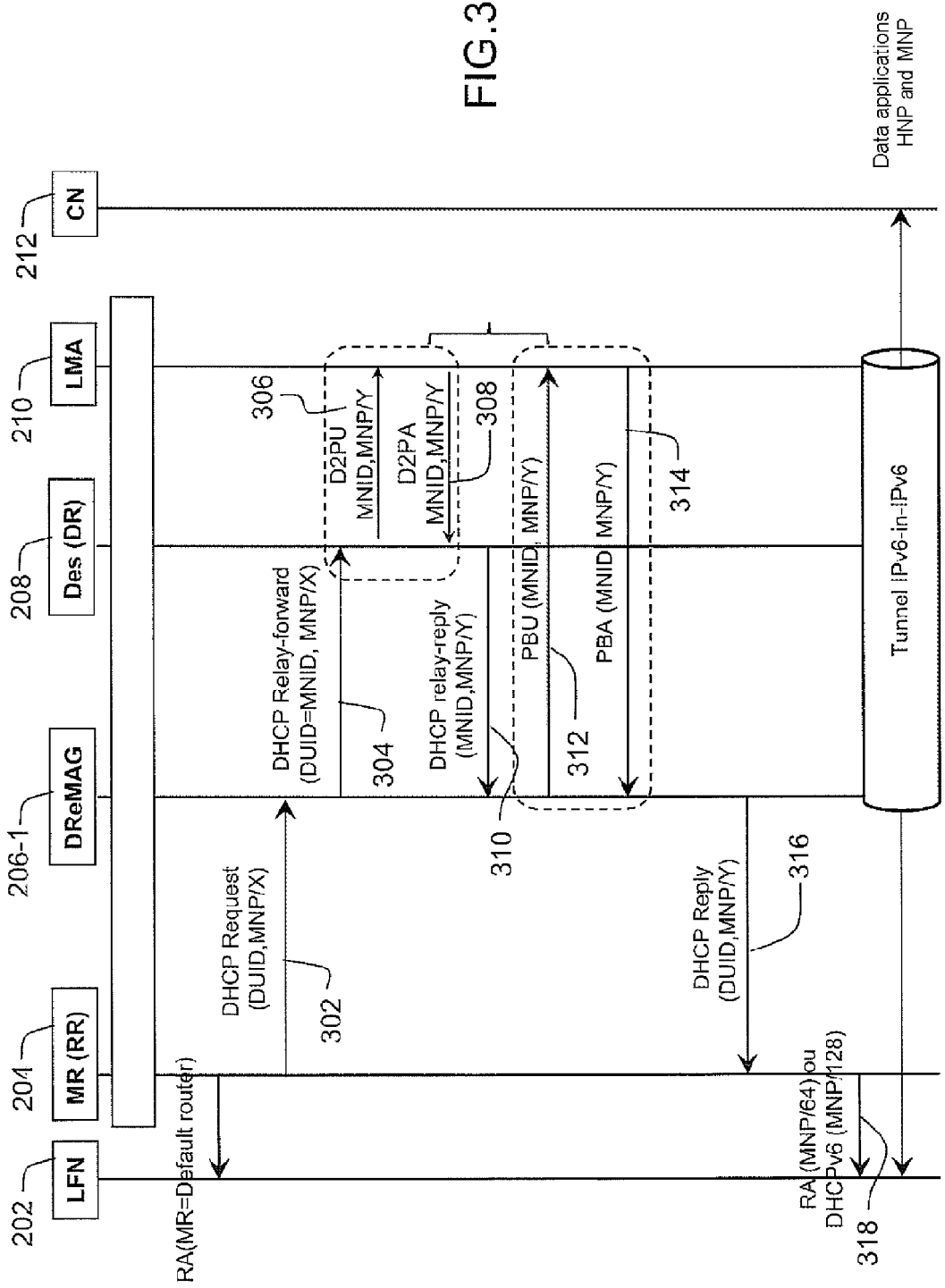
FIG. 3 shows in a diagram of data flow type a procedure for attaching a mobile router to the PMIP network according to the principle of the invention.

FIG. 3 shows in a diagram of data flow type, a procedure for attaching a mobile router to a PMIP network according to the principles of the present invention.

In an initial step, not shown in FIG. 3, the mobile router obtains an initial network prefix "Home Network Prefix or HNP" according to a PMIP conventional procedure. After having formed a global IP address for its own use, the mobile router (MR) executes a typical DHCP discovery procedure with dispatch and reception of well known messages "DHCP Solicit and DHCP Advertise".

In step (302) the mobile router (204) dispatches a DHCP request to obtain a Mobile Network Prefix MNP of size 'X' (MNP/X). The DHCP request contains a parameter "DHCP Unique Identifier or DUID" to uniquely identify the requesting router.

The request is received by the DHCP relay (206-1) which assigns to the identifier DUID a value of mobile network identifier "MNID". The allotted value MNID is that created during the execution of the PMIP initial procedure (not shown in FIG. 3).

In step (304), the DHCP request containing the identifier MNID is pushed by the relay to the DCHP server (208) in the form of a request "DHCP Relay-Forward". On receipt of the request, the server DSe allocates a prefix MNP of size 'Y' (MNP/Y) for the mobile router (MR). The size 'Y' of the allocated prefix may be equal or different from the size requested 'X' by the router depending on the resources available.

In step (310), the DHCP server dispatches a return DHCP "DHCP Relay-Reply" message to the MAG (206-1).

In a first implementation of the invention, before the server DSe dispatches the "DHCP Relay-Reply" return message, it informs in a step (306) the LMA of the new prefix allocation (MNP/Y). A DHCP signaling message to PMIP "DHCP to PMIP Update or D2PU" is created which comprises the allocated mobile network identifier (MNID). Optionally, the message D2PU can contain the global IP address of the mobile router and the mobile router prefix (MNP) allocated. In step (308), the server receives from the LMA (210) the acknowledgment of this message, in the form of a signaling message "DHCP to PMIP Acknowledgement or D2PA".

In an alternative implementation of the invention, after step 310 where the DHCP server (208) dispatches a return DHCP message (without having performed steps 306 and 308 of the previous alternative), the MAG takes charge of notifying the MNP to the LMA. On receipt of the "DHCP Relay-Reply" message originating from DSe and containing the MNP allocated for the Mobile Router, the MAG created in step (312) a signaling message PBU containing the allocated mobile network identifier (MNID) and the new prefix allocation (MNP/Y). The message PBU is dispatched to the LMA (210). In step (314), the LMA returns a signaling message PBA to the MAG.

After step (314), the MAG (206-1) dispatches to the mobile router (204) a DHCP response "DHCP Reply" containing the allocated mobile network prefix (MNP/Y).

In a subsequent step (318), the mobile router (204) announces in a message "Router Advertisement (RA)" a prefix derived from the MNP so that the LFN (202) can form an address, so as to allow bidirectional communication with a corresponding node (212).

Alternatively, the mobile router (204) can use DHCPv6 messages (and not Router Advertisement RA) to offer an address to the LFN, which address is formed by the mobile router on the basis of the MNP or of a prefix derived from this MNP. A prefix P derived from a prefix MNP/Y is any prefix whose length lies between Y and the total address length. By way of example, a prefix 2001:db8:1:1:1X is derived from the prefix 2001:db8:1:148 if and only if X is greater than 48, for example is equal to 56.

During a movement of the mobile network, a procedure for toggling the attachment of the mobile router to first MAG1 over to a neighbor MAG2 is executed according to the above-described principles of the invention. The toggling is performed initially according to the PMIP protocol for the 'mother network' (HNP) and 'mobile network' (MNP) prefixes. In a following step, the mobile router dispatches to the new MAG2 a DHCP confirmation request "DHCP confirm" which contains the identifier (DUID) and the previously allocated mobile network prefix (MNP/Y).

On receipt of the "DHCP Confirm" message the MAG2 inserts an entry into a routing table (R) containing the MNP and the source address of this message. Moreover, the MAG2 inserts entries into a tunnels table (T) and an inverse routing table (SR) which relate to the MNP. Thereafter it transmits the DHCP Confirm to the DSe in "DHCP Relay-Forward". The procedure thereafter executes steps 304 to 316 of FIG. 3 in a similar manner on the basis of the new MAG2 according to the alternative implementation.

In a first alternative implementation of the invention on the DHCP server DSe, on receipt of the "DHCP Relay-Forward" message, the DSe constructs and dispatches a message (D2PU) to the LMA informing it of the address of the new MAG2, of the MNP of the mobile router. The message (D2PU) also contains the HNP. On receipt, the LMA updates its association table (B), tunnels parameters table (T) and routing table (R) with respect to the MNP, to the HNP and to the new MAG2. The LMA thereafter dispatches the message D2PA to the DSe. The DSe creates the "Relay-Reply" message for the MR, when the D2PA is received. When the DRe receives this message, it updates its tables (B) and (R) with respect to the HNP. In this manner the complete IP paths between CN and LFN are updated after a toggling of the MR, and LFN continues to use the MNP initially assigned by the "DHCP Prefix Delegation" procedure.

In a second alternative implementation of the invention on the MAG, on receipt of the "DHCP Confirm" message by the MAG2, the latter inserts entries relating to the MNP into the tables (T) and (SR) and transmits the "DHCP Relay-Forward" message to the DSe. The MAG2 waits for the receipt of the "DHCP Relay-Reply" message from the DSe informing it of the success of the operation for maintaining the MNP to the DHCP Server. It should be pointed out that the messages D2PU and D2PA are not used in this second alternative implementation. Thereafter, the MAG2 dispatches to the LMA a message (PBU) containing the values of the (MNID) and of the (MNP/Y). On receipt of the message (PBU), the LMA updates its tables (B), (T) and (R) relating to the HNP and MNP. Next the LMA dispatches a message (PBA) to the MAG2. On receipt of the message (PBA), the MAG2 updates its entries in its tables (T) and (SR) relating to the HNP. Next, the MAG2 transmits a "DHCP Relay-Reply" message to the mobile router (MR) thus making it possible to establish the bidirectional IP communication between the LFNs and the corresponding nodes CNs.

During a detachment of a mobile router from the PMIPv6 domain, a detachment procedure is executed according to the principles of the invention. The mobile router (204) dispatches to the DHCP server via the MAG a DHCP detachment request "DHCP release". The request contains the identifier (DUID) and the previously allocated mobile network prefix (MNP/Y). The procedure thereafter executes steps 304 to 316 of FIG. 3 in a similar manner.

In a first alternative implementation of the invention on the DHCP server, on receipt of the "DHCP Relay-Forward" message, the DSe transmits to the LMA a message (D2PU). On receipt of the message (D2PU), the (LMA) erases its entries in the tables (B), (R) and (T) relating to the HNP and MNP, and then dispatches a message (D2PA) to the DSe. On receipt of the message (D2PA), the DSe erases the data relating to the allocation of the MNP, and dispatches a "DHCP Relay-Reply" message to the DRe. The DRe erases its entries relating to the HNP and MNP and dispatches the "DHCP Reply" message to the mobile router.

In a second alternative implementation of the invention on the MAG, the order of erasure of the data is regulated by the messages (PBU) and (PBA) in a manner similar to steps 312 and 314.

Figure 4B:
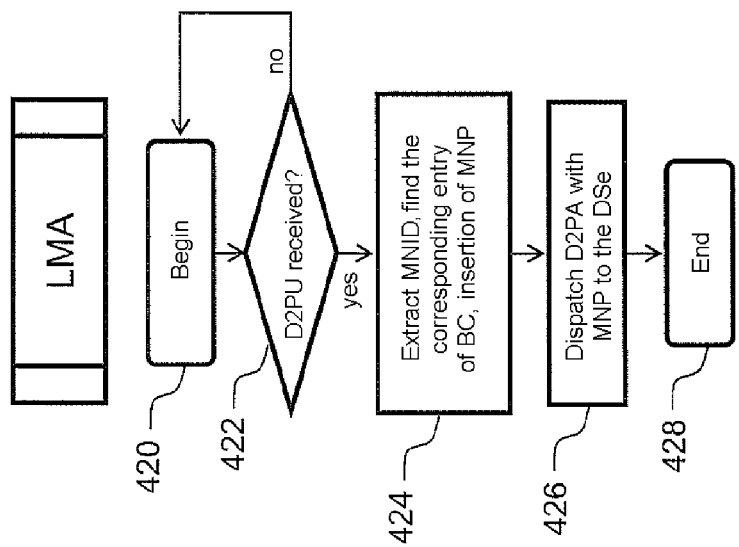
FIGS. 4a and 4b illustrate the procedures executed respectively on the entities DSe and LMA in a first alternative implementation of the invention.
Figure 4A:
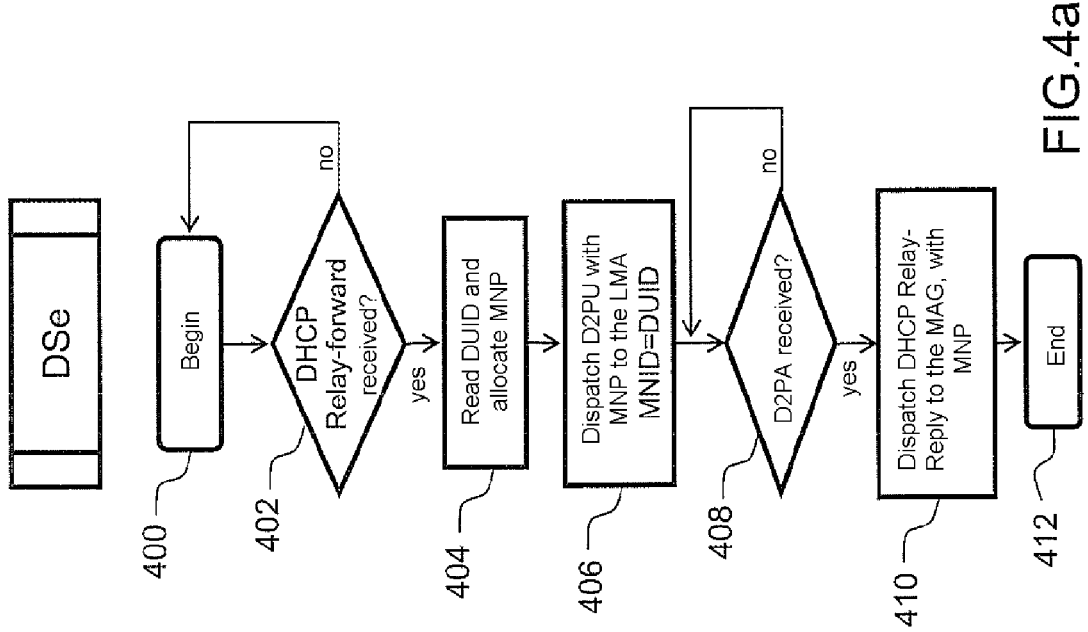

FIGS. 4a and 4b show in a diagram of pseudocode type, the procedures executed respectively on the entities DSe and LMA in a first alternative implementation of the invention.

The procedure 400 of FIG. 4a executes on the DCHP server. The DSe waits at 402 to receive a "DHCP Relay-Forward" message corresponding to a request emitted by a mobile router (MR).

In step 404, the DSe extracts the identifier (DUID) of this message. As described above, the identifier (DUID) has previously been initialized by the MAG to the value of the mobile network identifier (MNID).

In step 406, the DSe allocates an MNP and dispatches it to the LMA inside a message (D2PU) which also contains the (MNID).

In step 408, the DSe waits to receive a message (D2PA) originating from the LMA.

On receipt of this message (D2PA), in step 410 the DSe dispatches a "DHCP Relay-Reply" message to the MAG and the procedure stops (412).

The procedure 420 of FIG. 4b executes on the LMA. The LMA waits in step 422 to receive a message (D2PU).

On receipt of the message (D2PU), in step 424, the LMA extracts the (MNID) and the (MNP/Y) contained in the message. Next as explained previously, the LMA uses the (MNID) to find in its association table (B) the (HNP) and the address of the MAG (MAGe@). The LMA uses the (HNP) to search through its routing table (R) and to find the corresponding entry in the list of the parameters of tunnels (T). The LMA inserts an entry into (B) containing the (MNID), the (MNP) and the address (MAGe@). The address MAGe@ is contained in the source address field of the packet (D2PU). LMA inserts an entry into (R) containing the (MNP) which points to an entry in the tunnels table (T). This entry in (T) is created previously when allotting (HNP) to the (MR). To identify this entry, the MAG searches through all its entries of (B) for the one which corresponds to the (MNID), extracts the (MAGe@) therefrom and uses it to search for an entry in (T). The entry in (T) is used in (R) for the active MNP.

In step 426, the LMA dispatches the message (D2PA) to the DSe containing the identifier (MNID) and the (MNP/Y) and the procedure stops (428).

Figure 5A:
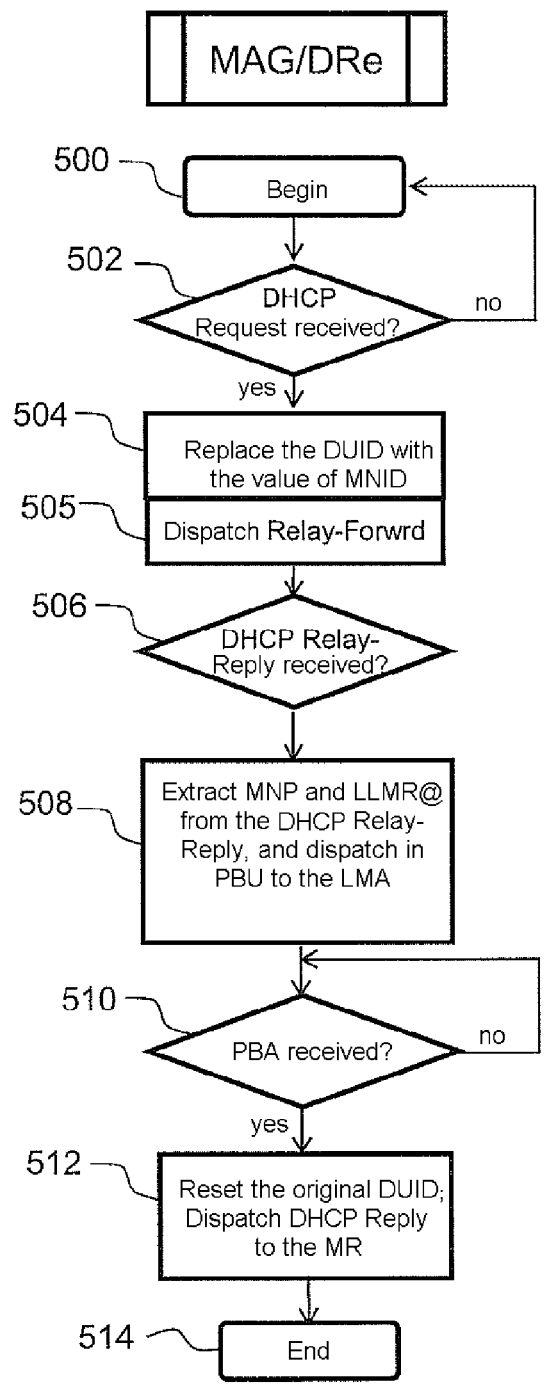
FIGS. 5a and 5b illustrate the procedures executed respectively on the entities MAG/DRe and LMA in a second alternative implementation of the invention.
Figure 5B:
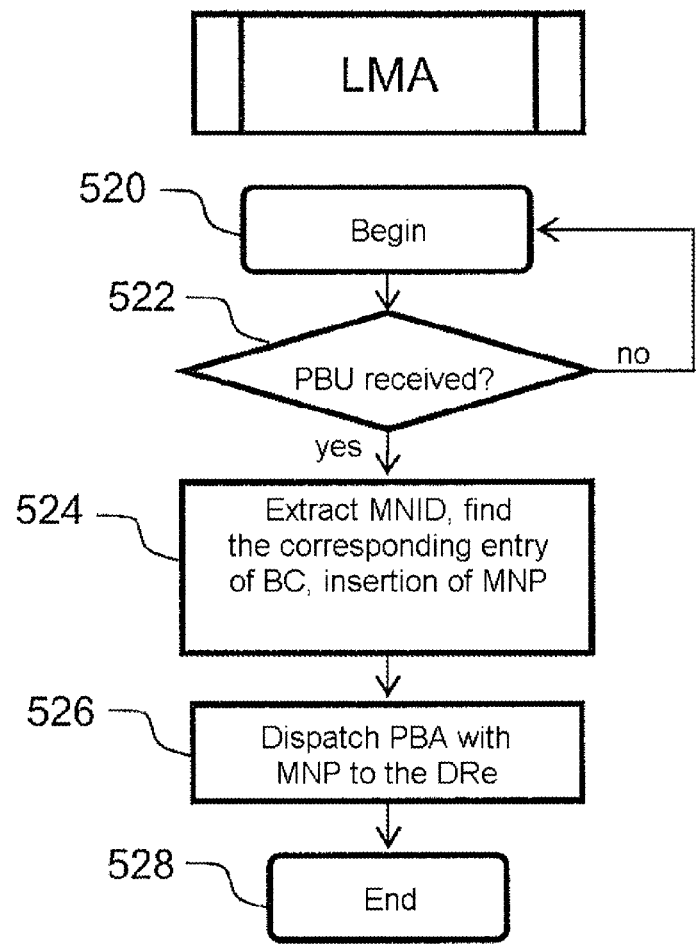

FIGS. 5a and 5b show in a diagram of pseudocode type, the procedures executed respectively on the entities MAG/DRe and LMA in a second alternative implementation of the invention.

The procedure 500 of FIG. 5a executes on the MAG where the DHCP relay DRe is associated. The MAG waits at 502 to receive a "DHCP Request" message corresponding to a request emitted by a mobile router (MR).

In step 504, it extracts the identifier (DUID) and allots it the value of the (MNID) associated with the MR. Next it dispatches the "DHCP Relay-Forward" message.

In step 506, it waits for a "DHCP Relay-Reply" return message.

On receipt of this message, in step 508 it extracts the (MNP) and the MR's link-local address present in this message (LLMR@). Next it created a message (PBU) and dispatches it to the LMA.

In step 510, the MAG waits to receive a message (PBA) emitted by the LMA. The message (PBA) emitted by the LMA contains, inter alia, the options (MNID) and (MNP) formatted as in the message (PBU).

The message (PBA) contains in its header an additional field to communicate the "Status" of the execution of the message (PBU). For this field, the same "Status" values defined by PMIPv6 for an HNP are used.

In step 512, on receipt of the message (PBA), the MAG will extract the identifier (MNID) and use it to find either the (LLMR@) or else the address of the egress interface of the MR (based on HNP). This search can be carried out in the tables of the "DHCP Relay" or of PMIPv6. The MAG also uses the (MNID) to find the (HNP) and the entry corresponding to the (HNP) in (T). An entry is inserted into (R) containing (MNP) and (LLMR@) or else the address of the egress interface of the MR. An entry is also inserted into (SR) containing (MNP) and the entry corresponding to the (HNP) in (T). The MAG dispatches the "DHCP Reply" message and the procedure stops (514).

The procedure 520 of FIG. 5b executes on the LMA. The LMA waits in step 522 to receive a message (PBU).

On receipt of the message (PBU), in step 524, the LMA extracts the (MNID) and the (MNP/Y) contained in the message. Next as explained previously, the LMA uses the (MNID) to find in its association table (B) the (HNP) and the address of the MAG (MAGe@). The LMA uses the (HNP) to search through its routing table (R) and to find the corresponding entry in the list of the parameters of tunnels (T). The LMA inserts an entry into (B) containing the (MNID), the (MNP) and the address (MAGe@). The address MAGe@ is contained in the source address field of the packet (D2PU). LMA inserts an entry into (R) containing the (MNP) which points to an entry in the tunnels table (T). This entry in (T) is created previously when allotting (HNP) to the (MR). To identify this entry, the MAG searches through all its entries of (B) for the one which corresponds to the (MNID), extracts the (MAGe@) therefrom and uses it to search for an entry in (T). The entry in (T) is used in (R) for the active MNP.

In step 526, the LMA dispatches the message (PBA) to the DRe containing the identifier (MNID) and the (MNP/Y) and the procedure stops (528).

It should be noted that after the execution of one or the other of the routines (400, 420) or (500, 520) according to the alternative implementation, all the entries in the routing and association tables are registered so as to allow the end-to-end transmission of data packets between each LFN and its CN or CNs with which it maintains IP sessions.

An important advantage of the method described is that it allows the use of completely different HNP and MNP prefixes, having no left-anchored sequence of bits in common, of any length. By way of example, an MNP could be "ffff::/16" and an HNP could be "0001::/15", having no left-anchored sequence of bits in common, the first bit being 1 for MNP and 0 for HNP.

The person skilled in the art will appreciate that variations may be made to the method as described in a preferential manner, while maintaining the principles of the invention. Thus, it is possible not to use a DHCP relay and to execute the routine 500 on the MAG alone.

An alternative can consist in co-locating a DHCP Server with the LMA or keeping them distinct.

Another alternative in a very extended network can consist in modifying the behaviors of each of the MAG, LMA, DRe, and DSe, or else in modifying only certain entities.

In a variant implementation where a DHCP server is not deployed in a PMIP network, the MAG will act as a DHCP proxy. It listens for DHCP messages emitted by a mobile router (MR) and, on receipt of these messages, it generates modified PMIP messages (PBU) so as to obtain (MNPs) for the (MR) instead of (HNP). In this case, the (MNP) is allocated by the LMA, and not by a DHCP Server. This alternative is implementable in Internet access networks where address allocation is done by means other than DHCP, such as Radius or AAA.

The present invention can be implemented on the basis of hardware and/or software elements. It can be available as a computer program product on a computer readable medium.

The medium can be electronic, magnetic, optical, electromagnetic or be a broadcasting medium of infrared type. Such media are for example, semiconductor memories (Random Access Memory RAM, Read-Only Memory ROM), tapes, magnetic or optical diskettes or disks (Compact Disk-Read Only Memory (CD-ROM), Compact Disk-Read/Write (CD-R/W) and DVD).

Thus the present description illustrates a preferential implementation of the invention, but is not limiting. An example has been chosen to allow a good understanding of the principles of the invention, and a concrete application, but it is in no way exhaustive and should allow the person skilled in the art to make modifications and effect alternative implementations while retaining the same principles.

The invention claimed is:

1. A method for managing the mobility of a mobile network in a Proxy Mobile Internet Protocol (PMIP) environment operating under the Dynamic Host Configuration Protocol (DHCP) protocol, said mobile network comprising a mobile router in communication with at least one user device, the method comprising the following steps:
receiving a DHCP Request message requesting a mobile network prefix, the message containing a unique DHCP identifier to identify the requesting mobile router (DUID);
allotting a mobile identifier value (MNID) to the unique DHCP identifier;
generating a DHCP Relay-Forward message requesting a mobile network prefix, the message containing the allotted value of the mobile identifier (MNID);
receiving a DHCP Relay-Reply response message containing an allocated mobile network prefix and the value of the mobile identifier (MNID);
restoring the value of the unique DHCP identifier; and
transmitting a DHCP Reply response message containing the unique DHCP identifier of the requesting mobile router (DUID) and the allocated mobile network prefix.

2. The method as claimed in claim 1, in which the requested mobile network prefix and the allocated mobile network prefix are of different length.

3. The method as claimed in claim 1, comprising, after the step of generating a message requesting a mobile network prefix, the steps of:
- generating a DHCP/PMIP update message (D2PU) toward a point of attachment (LMA) of the PMIP environment, said message containing the allocated mobile network prefix and the value of the mobile identifier (MNID);
- updating the routing tables for the point of attachment with respect to the content of said message D2PU; and
- generating a DHCP/PMIP update confirmation message (D2PA).

4. The method as claimed in claim 1, comprising, after the step of receiving a response message, the steps of:
- generating a Proxy Binding Update update message (PBU) toward a point of attachment (LMA) of the PMIP environment, said message containing the allocated mobile network prefix and the value of the mobile identifier (MNID);
- updating the routing tables for the point of attachment with respect to the content of said message PBU; and
- generating a Proxy Binding Acknowledgement update confirmation message (PBA).

5. The method as claimed in claim 1, in which the DHCP Request message requesting a mobile network prefix is a DHCP confirmation message of previously allocated mobile network prefix, the method comprising after the reception step the steps of:
- allotting a mobile identifier value (MNID) to the unique DHCP identifier;
- generating a DHCP Relay-Forward message of confirmation of mobile network prefix, the message containing the allotted value of the mobile identifier (MNID);
- receiving a DHCP Relay-Reply confirmation response message containing the mobile network prefix and the value of the mobile identifier (MNID);
- restoring the value of the unique DHCP identifier; and
- transmitting a DHCP Reply response message, the message containing the unique DHCP identifier of requesting mobile router (DUID) and the allocated mobile network prefix.

6. The method as claimed in claim 1, in which the DHCP Request message requesting a mobile network prefix is a DHCP Release message of detachment of the mobile network.

7. The method as claimed in claim 1, in which the Proxy Mobile IP environment is a PMIPv6 environment.

8. The method as claimed in claim 1, in which the DHCP protocol is the DHCPv6 protocol.

9. The method as claimed in claim 1, in which step generates a DHCP Relay-Forward message requesting a mobile network prefix toward a DHCP server.

10. A system for managing the mobility of a mobile network in a Proxy Mobile Internet Protocol (PMIP) environment operating under the Dynamic Host Configuration Protocol (DHCP) protocol, said mobile network comprising a mobile router in communication with at least one user device, the system comprising means for implementing the steps of the method as claimed in claim 1.

11. The system as claimed in claim 10, where said at least one user device belongs to the group of devices comprising a laptop computer, tablet PC, and portable telephone.

12. The system as claimed in claim 11, where the mobile router has an initial network prefix (HNP) different from the allocated mobile network prefix.

13. A computer program stored in a non-transitory computer-readable medium, said computer program comprising code instructions making it possible to perform the steps of the method as claimed in claim 1, when said program is executed on a computer.

* * * * *